United States Patent [19]

Garfield

[11] 4,299,205
[45] Nov. 10, 1981

[54] HEAT ENERGY COLLECTOR

[76] Inventor: James R. Garfield, 2700 Balmoral Ct., Ft. Collins, Colo. 80525

[21] Appl. No.: 95,207

[22] Filed: Nov. 19, 1979

[51] Int. Cl.³ .................... F24J 3/02; F28F 13/18
[52] U.S. Cl. .................... 126/449; 126/901; 165/133
[58] Field of Search .............. 126/449, 901, 417; 165/133

[56] References Cited

U.S. PATENT DOCUMENTS

| 3,022,781 | 2/1962 | Andrassy | 126/448 |
|---|---|---|---|
| 3,236,294 | 2/1966 | Thomason | 126/437 |
| 3,239,000 | 3/1966 | Meagher | 126/448 |
| 3,265,124 | 8/1966 | Reys | 165/133 |
| 3,902,474 | 9/1975 | Pyle | 126/449 |
| 3,968,786 | 7/1976 | Spielberg | 126/442 |
| 4,082,082 | 4/1978 | Harvey | 126/449 |
| 4,114,599 | 9/1978 | Stephens | 126/901 |
| 4,119,083 | 10/1978 | Heyen et al. | 126/449 |
| 4,122,239 | 10/1978 | Riboulet | 126/901 |
| 4,128,095 | 12/1978 | Oren et al. | 126/449 |
| 4,129,117 | 12/1978 | Harvey | 126/449 |
| 4,153,753 | 5/1979 | Woodman et al. | 126/901 |
| 4,166,445 | 9/1979 | McGraw | 126/449 |

FOREIGN PATENT DOCUMENTS

| 2709837 | 9/1977 | Fed. Rep. of Germany | 126/901 |
|---|---|---|---|
| 2732539 | 2/1979 | Fed. Rep. of Germany | 126/901 |
| 2820715 | 11/1979 | Fed. Rep. of Germany | 126/449 |
| 2362357 | 4/1978 | France | 126/901 |

Primary Examiner—Daniel J. O'Connor
Attorney, Agent, or Firm—Hugh H. Drake

[57] ABSTRACT

A collector for heat energy from a solar or other source is in the form of a body of given thickness. The body is composed of a packed plurality of particles of coal, and each of those particles is selected to have a maximum size of between approximately one-fourth and one-half of the given thickness of the body. Substantially permeated throughout the particles is an elastomeric binder. It forms a continuous coating over the surface of the body and cohesively rigidifies the particles together, so that the body is at least substantially self supporting. A major surface of the body is exposed directly to solar radiation as a result of which heat energy is absorbed within the body. Subsequently, that heat energy is re-radiated or otherwise conveyed out passively into an adjacent space or interactively with a fluid moved across a surface of the body or through the interior of the body.

21 Claims, 7 Drawing Figures

HEAT ENERGY COLLECTOR

The present invention relates to a heat energy collector. More particularly, it pertains to a medium for receiving and storing heat energy that subsequently is transferred therefrom and used in a heating or cooling system.

Substantial attention has been given to the possibilities of using energy received from the sun in the form of radiation for doing useful work. The conversion from radiant energy to the performance of the ultimate function involves any one or more of such processes as chemical, mechanical or electrical. In all stages of such systems, high efficiencies of transfer and conversion are required to accommodate practical size limitations and economic feasibility. This is because, as compared with other fuels such as gases, oils and nuclear materials, solar heat as received at the surface of the earth is rather dilute. From the viewpoint of producing electrical energy, the energy received from the sun approximates only about one-thousand watts per square meter. With present day technology being capable of converting radiant energy to electrical energy with an efficiency no higher than, perhaps, ten percent in practical systems, it will be appreciated that a significantly large roof top or other area must be provided for mounting a solar energy collector if more work is to be obtained than merely energizing a few electric light bulbs. Consequently, large amounts of research have been devoted to improving efficiencies in every stage or other portion of such systems.

Another obvious source of difficulty in using solar energy arises from the face that its intensity is not constant. It, of course, is unavailable during the nighttime hours and its level is at least substantially reduced by clouds and airborne pollutants. Accordingly, the continued availability of useful energy requires the inclusion of heat storage. The conversion from the received solar energy to some form of stored energy again may involve any one or more of chemical, mechanical or electrical processes, and conversion efficiencies continue to be extremely important in those portions of the systems.

Because of the practical limitations upon available space for any given installation and the cost of the physical apparatus required, the prior art reveals numerous suggestions for achieving better collection of the solar energy. Many systems employ wide-area collection surfaces from which absorbed heat energy then is conveyed elsewhere for use or storage. Quite frequently, the heat energy is transferred to a moving fluid that conducts the heat away from the collection medium itself. Absent a capability of instantaneous transfer from the collection medium to the fluid or other means of conduction, it is necessary for the collection medium to exhibit what amounts to a degree of temporary storage if for no reason other than to allow a spreading of whatever interface exists between the collection medium and the transfer element. On the other hand, anything less than instantaneous transfer from the collection medium contributes further to losses.

In one specific prior approach shown in U.S. Pat. No. 3,239,000-Meagher, water to be heated is caused to flow through tubing in a solar panel. The tubing is made of a rubber or plastic that is impregnated with carbon black. The tubes are subsequently formed by extrusion. The approach in U.S. Pat. No. 3,022,781-Andrassy forms solar heater conduits of flexible film members. In one embodiment, those members are made of a plastic which incorporates carbon black as a pigment. Analogously, the construction of solar heat absorbing tubing in U.S. Pat. No. 3,968,786-Spielberg uses a plastic material which contains small subdivided black body absorber particles. The finely divided particulates, for which the plastic material serves as a binder, may be a carbon black or crushed coal. Whatever the source of the coal, it is in the form of a finely divided powder that has particulates of no more than about ten microns in size or is in the form of ultrafine strands or fibers. Thus, all of these approaches involve using the well known property of a black material as a heat absorber and they recognize that carbon in itself is an appropriate type of such material.

Instead of causing a fluid to be heated to flow through tubing the walls of which are composed of minute carbon fines within a binder such as plastic, the solar energy collector in U.S. Pat. No. 4,129,117-Harvey effects flow of the fluid to be heated in a tortuous path through a loosely contained volume of carbon particulates. Those particulates are discrete granules of carbon that may have a size of about three to four millimeters. The loose particulates (or fibers) are contained within a hollow housing that has a transparent wall through which the radiant energy is received. The housing walls constitute the tubing through which the fluid to be heated is conveyed. Of course, the resultant hollow housing must both confine the fluid being conveyed and retain the particulates in place as well as support their weight.

One particular difficulty with this approach arises from the direct contact between the carbon particulates and the flowing fluids. Either oxidation agents or impurities within the fluid may interact with the carbon in a manner to cause the build up of a coating upon the surface of each particulate or otherwise interfere with the capability of the carbon material itself to absorb and transfer heat. Being combustible, the carbon particulates also pose a danger arising from the possibility of combustion in the presence of oxygen.

Carbon has also been recognized for its heat absorbing properties in other devices such as heat exchangers wherein heat is transferred from one flowing fluid to another. In the case of U.S. Pat. No. 3,265,124-Reys, for example, a hollow graphite tube is coated by a material such as Teflon which assists in precluding scale formation, is chemically inert and has a high thermal stability. After the graphite material has been coated, it is said to be impregnated with a thermosetting resin to make the graphite impervious to fluid seepage through the pores between adjacent graphite particles.

As recognized in U.S. Pat. No. 2,236,294-Thomason, an additional practical problem which must be tackled in connection with the construction of any solar collector is that of accommodating expansion and contraction which occurs as between different operating temperature levels. Of course, the collection medium itself is subject to operation at substantial differences in temperature at different times. In the case of an apparatus using tubing within the walls of which a carbon powder is dispersed, the tubing will shorten and elongate as temperatures vary. When, instead, a fluid to which heat is to be conveyed must flow through a mass of carbon particulates, the expansion and contraction of the particulates effect corresponding changes in flow capacity. At the higher temperatures within a range of operation, expansion of the particulates would reduce the fluid flow rate at a time when conditions were otherwise such as to accommodate a larger rate of flow of the fluid.

It is a general object of the present invention to provide a new and improved heat energy collector.

Another object of the present invention is to provide a new and improved heat energy collector which achieves many of the aims of the aforementioned prior art while yet avoiding various deficiencies and disadvantages thereof.

A further object of the present invention is to provide a heat energy collector which in use is essentially self-supporting.

One specific object of the present invention is to provide a heat energy collector which is inert to chemical or mechanical interaction, other than heat transfer itself, with associated heat-conductive fluids.

Another specific object of the present invention is to provide a heat energy collector which may be formed in situ.

A further specific object of the present invention is to provide a heat energy collection medium which is capable of being implemented into a variety of different structural approaches and modes of heat transfer.

An overall objective is to provide a new and improved heat energy collector which exhibits a comparatively high efficiency and yet which is economical and relatively lightweight.

In accordance with the present invention, a heat energy collector includes a body that has a predetermined minimum thickness. The body is composed of a packed plurality of particles of a material the primary ingredient of which is carbon. Each of the particles has a maximum external dimension of between approximately one-fourth and one-half the minimum thickness of the body. An elastomeric binder is substantially permeated throughout the particles and also forms a continuous coating over the exterior surface of the body. The binder cohesively rigidifies the particles together sufficiently to render the body at least substantially self supporting.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

The heat collection medium to be described finds utility in a variety of different heat storage and heat transfer apparatus. As specifically illustrated in FIGS. 1-5, therefore, solar collector 10 represents and is exemplary of only one of many possible structures and kinds of systems within which the collection medium may be implemented. Moreover, it will also be pointed out hereinafter how certain components specifically represented may be modified, omitted or augmented to obtain a mode of operation different from that which is first to be discussed.

Figure 1:
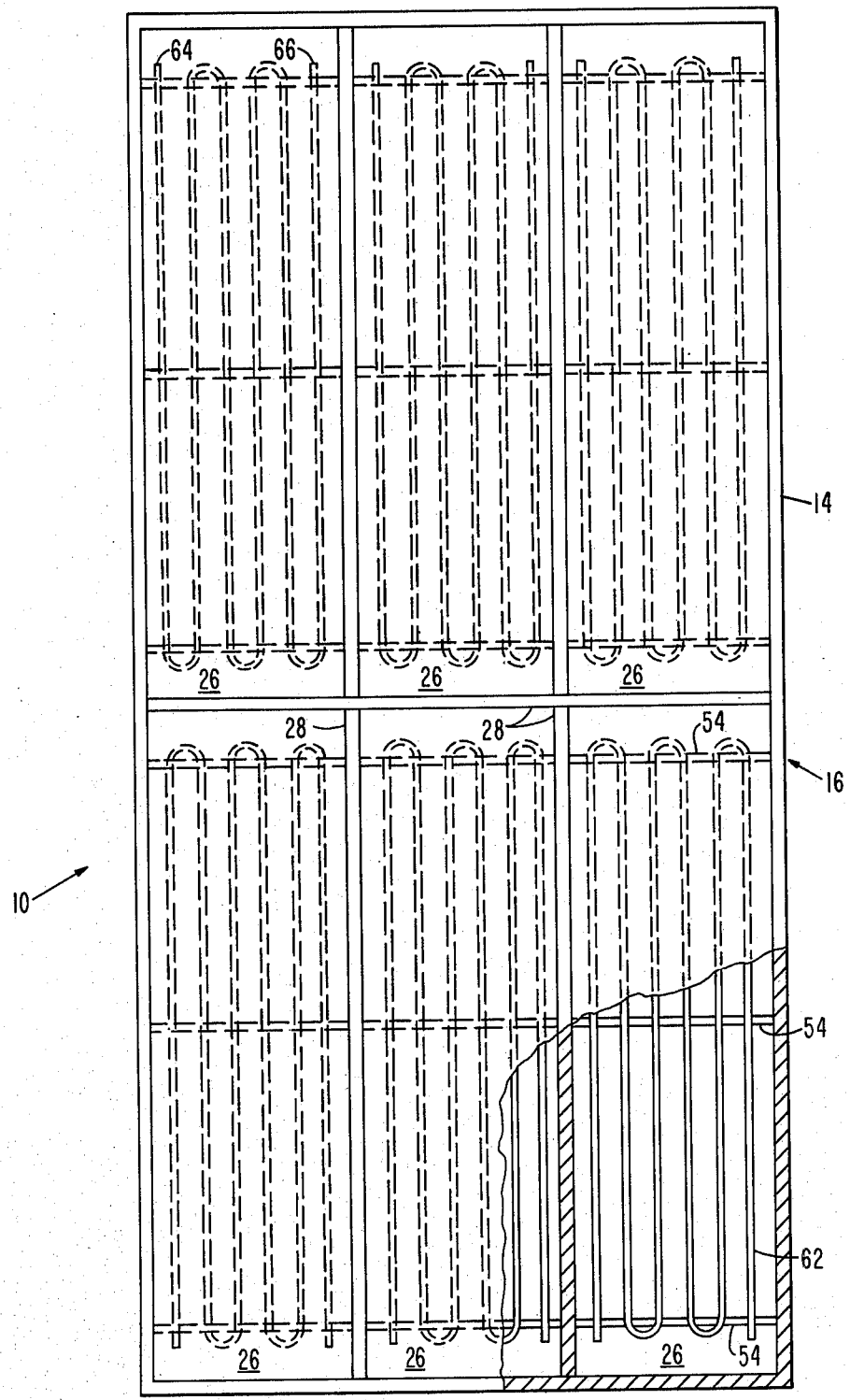
FIG. 1 is a top plan view, partially broken away, of a heat energy collector embodying the present invention.
Figure 2:
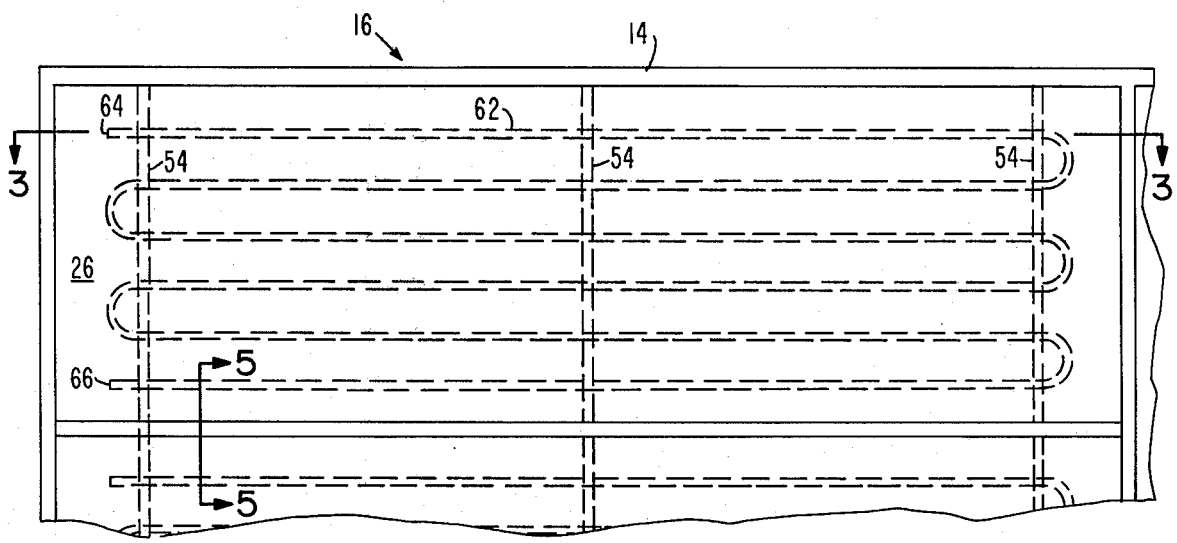
FIG. 2 is an enlarged fragmentary view of a portion of FIG. 1.
Figure 3:
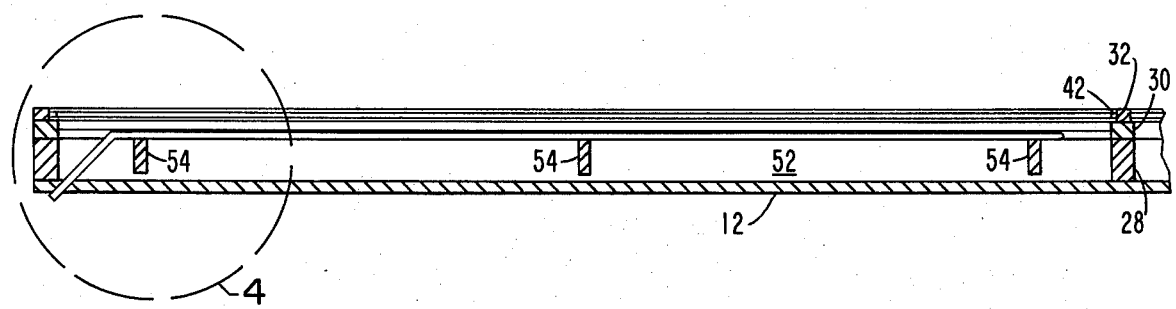
FIG. 3 is a cross-sectional view taken along the line 3—3 in FIG. 2.
Figure 4:
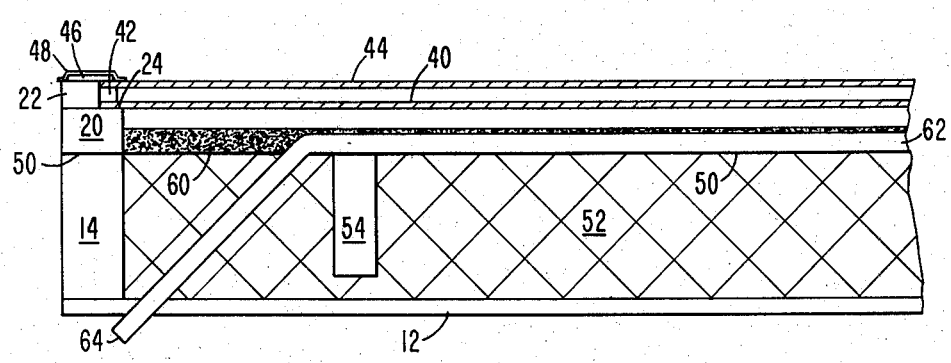
FIG. 4 is a magnified view of an indicated portion of FIG. 3.
Figure 5:
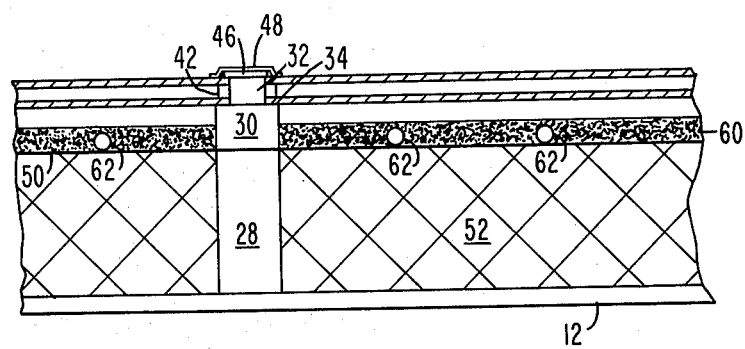
FIG. 5 is an enlarged cross-sectional view taken along the line 5—5 in FIG. 2.

Collector 10 is mounted on a substrate 12, which may be the roof sheathing of a building to be heated or cooled. Projecting upwardly from substrate 12 are the surrounding walls 14 of a box-like housing 16. Running along the top of each of walls 14 and of the same width is a spacer 20. A strip 22 is mounted on and flush with the outside of spacer 20, but it is of narrower width so as to leave an interior ledge 24. Disposed within the housing 16 is a latticework that defines a plurality or array of individual cells 26. As shown in FIG. 1, there is two-by-three array of cells 26, although those numbers may be increased or decreased as desired or as necessary to accommodate the area of substrate 12 available.

Bounding the interior sides of each cell 26 and projecting upwardly from substrate 12 is a beam 28 coextensively on top of which is a spacer 30. Atop spacer 30 runs a centered and more narrow strip 32. A ledge 34 is thus defined on the upper surface of spacer 30 along each side of strip 32. In a successively-operated version, all of walls 14, spacers 20 and 30 and strips 22 and 32 were lengths of wood suitably mitered or otherwise fitted at their respective different corners.

The upper ends of walls 14 and all of beams 28 are spaced at the same distance from substrate 12 as are the thicknesses in that direction of all spacers 20 and 30 and all strips 22 and 32, so that all ledges 24 and 34 are disposed at the same level. Disposed at its edge margins on and spanning the distance between each space-opposed pair of corresponding ones of ledges 24 and 34 are respective different lower sheets 40 of a material, such as tempered glass, which is transparent to radiant energy from the sun. Encircling the marginal portion of and disposed on top of each sheet 40 is a spacing gasket 42. Another transparent sheet 44, of the same or of an equivalent material, is mounted along its peripheral portion upon the upper surface of gasket 42. Extending from the upper surface of each of strips 22 or 32 and on over the top margin of upper sheet 44 is a sealing gasket 46 clamped in place by cover trim 48. Gaskets 42 and 46 in this case are of rubber, while trim 48 preferably is made of stainless steel or aluminum, so as to be unaffected by weathering elements. It will be observed that each cell 26 is closed on its upper side by what amounts to a double-paned window within the interior of which the two panes define an insulating air space.

Stretched across the upper surfaces of all of walls 14 and beams 28 is a finely-meshed screen 50 which preferably is of the kind in which elongated nylon fibers are plastic coated. The correspondingly spaced portions of screen 50 are clamped into place by the respective different ones of spacers 20 and 30. Filling the volume within each cell 26 between substrate 12 and screen 50 is insulation 52 which in this case is a spun fiberglass material. Spanning the distance across the more narrow dimension of each cell 26, and thus secured between a wall 14 and a beam 28 or between a pair of beams 28, are stringers 54. The bottom of each stringer 54 is spaced a short distance above substrate 12, while its top surface is even with the tops of beams 28 so as also to support a portion of screen 50. As shown, there are three of stringers 54 within each cell and they are seated within insulation 52 so that a portion of the latter runs beneath the stringers. Two of the stringers, which in this case also are wooden, are spaced a short distance inwardly from the adjacent ones of walls 14 or beams 28, and the third stringer is disposed in a position intermediate the length of the corresponding cell.

Disposed on top of screen 50 in each cell 26, and spanning the distance between space-opposed ones of walls 14 and beams 28 or directly between two such beams, is a slab 60 which serves as a heat collection and transfer medium. Co-planar with, and in this case nested within slab 60, is a serpentine array of tubing 62 preferably formed of an excellent heat conductor such as copper. The opposite end portions of tubing 62 are bent to emerge downwardly from slab 60, through insulation 52 and substrate 12, and below which they constitute respective inlet and outlet ends 64 and 66 to which associated heating or cooling apparatus may be coupled externally of cells 26.

As shown, tubing 62 has an outside diameter approximately the same as the thickness of slab 60, so that the serpentine array of tubing is just barely embraced within the opposed major surfaces of slab 60. Although not as preferable, tubing 62 may instead be of smaller relative diameter so as to be disposed at a further depth from the surfaces of slab 60. On the other hand, slab 60 may have a comparatively smaller thickness so that a portion of the tubing wall is exposed upwardly and the slab necessarily is divided into different segments individually between or adjacent to different sizes of the tubing walls.

Without intending to define or even suggest any physical limitations upon the size of the assembly, a better grasp of a typical implementation may be had be setting forth different dimensions that were employed in the aforementioned operated version. With all dimensions given in inches and rounding off to a nearest inch in the case of longer distances, each of cells 26 was twenty-four by seventy-six. Glass sheets 40 and 44 each had thicknesses of one-eighth and were spaced apart by three-eighths. One-half inch copper stock was used to form tubing 62, and slab 60 had a thickness of approximately the same dimension. The different legs of tubing 62 within the sepertine array were spaced apart by about three and one-half inches and the ends and sides of that array were similarly spaced inside the boundaries of each of cells 26. All other dimensions are drawn approximately to scale in FIGS. 2–5.

It will thus be seen that the entire collector assembly is a sandwich of various materials and air spaces and is comparatively thin with respect to its length and width. As illustrated, the assembly may be constructed directly in place atop substrate 12 which also serves as roof sheathing for the building. Alternatively, of course, the assembly may be fabricated elsewhere with substrate 12 constituting a lower housing wall which may be mounted upon an existing roof or the like.

In use, inlet 64 and outlet 66 are to be coupled to an associated heating or cooling system located within the building beneath substrate 12. Circulated through tubing 62 therefrom is a fluid which exhibits good heat transfer capabilities. The portion of the total system located within the building or elsewhere may be entirely conventional. In the most direct adaptation, inlet 64 and outlet 66 are coupled to an arrangement of piping disposed adjacent to or within the walls, floors or ceilings of the building. Either a liquid or a gaseous fluid is pumped so as to circulate through that arrangement and tubing 62.

In operation, heat energy radiantly received through sheets 40 and 44 is received by the upper surface of slab 60 and absorbed within the slab material. That absorbed heat energy, temporarily stored within the body of slab 60, is transferred to tubing 62 wherein it serves to heat the circulated fluid. In turn, of course, the circulated fluid conveys the transferred heat energy on outwardly from collector 10. Thus, solar energy is received by the collector and ultimately transferred to the interior piping arrangement where it gives off energy for heating the building space.

Numerous alternative adaptations will be recognized. In perhaps the simplest, everything shown in the drawings as disposed beneath slab 60 is omitted and slab 60 is merely mounted within suitable openings defined in the roof sheathing or other form of substrate 12. Also omitting tubing 62, slab 60 then serves directly and passively simply to receive and thereafter transfer into the interior of the building the heat energy which is collected.

In one reversal of overall operation that will be readily understood, tubing 62 is connected by means of inlet 64 and outlet 66 into a cooling system wherein the heat energy conveyed into the building from collector 10 is employed to deliver heat to or even act as an evaporator portion of the cooling system. On the other hand, the fluid circulated and heated within tubing 62 may be coupled to an appropriate heat storage reservoir located in, beneath or otherwise associated with the building. The construction and operation of such reservoirs, in themselves, are now well known with regard to heat pumps and even for storage associated with solar collectors in general and as employed either for heating or cooling or both.

In a non-solar reverse mode of operation for cooling, transparent sheets 40 and 44 are omitted and the upper surface of slab 60 is exposed to the atmosphere outside the building in a naturally shady location or is otherwise coupled into an environment wherein the ambient temperature is lower than that of the environment to which inlet 64 and outlet 66 are effectively coupled by the circulating fluid. In this particular case, the upper surface of slab 60, coupled to the lower-temperature environment, may be coated with a thin sheet of a material of high heat conductivity, so as more efficiently to couple the collected heat energy from within slab 60 to the exterior. However, the material of slab 60, yet to be described in detail, is itself a good heat coupler.

In still another adaptation, the serpentine array formed by tubing 62 is disposed contiguously with the undersurface of slab 60. In that case, slab 60 preferably is as thin as possible, consistent with the support requirements, so as to introduce the minimum heat loss through the body of the slab itself. In what is structurally the reverse of that approach, the serpentine array of tubing 62 is disposed so as to be contiguous with the upper surface of slab 60. In this version, slab 60 desirably is much thicker in order better to serve the function of a storage medium coupled to tubing 62.

In yet another adaptation, inlet 64 and outlet 66 are connected directly into spaced portions of the cavity defined between the upper surface of slab 60 and lower transparent sheet 40, while tubing 62 in itself is eliminated. Consequently, the circulated fluid is moved through the cavity, over and adjacent to slab 60, for the purpose of heat transfer with respect to the medium within the body of the slab. In one version of this approach, wherein the circulating fluid is a liquid, it is, of course, absolutely necessary that the boundaries of the cavity between slab 60 and lower sheet 40 be sealed or otherwise formed to be liquid impermeable. Using an appropriate sealing material for this purpose that is inert to a non-potable liquid such as salt water, or other liquid to be processed, the liquid is circulated across the upper surface of slab 60 for the purpose of adding heat energy into the liquid and thereby aiding the operation of an external distillation system or the like. In another version, a liquid is distilled in situ by causing a preferably thin film of the liquid to flow over slab 60 in order to effect evaporation of the liquid. By eliminating sheet 40 and tilting sheet 44 at an angle to slab 60, or inserting a separate tilted transparent sheet above the slab, vapor condensed on the undersurface of the sheet drains downwardly and into a suitably disposed collection trough.

Figure 6:
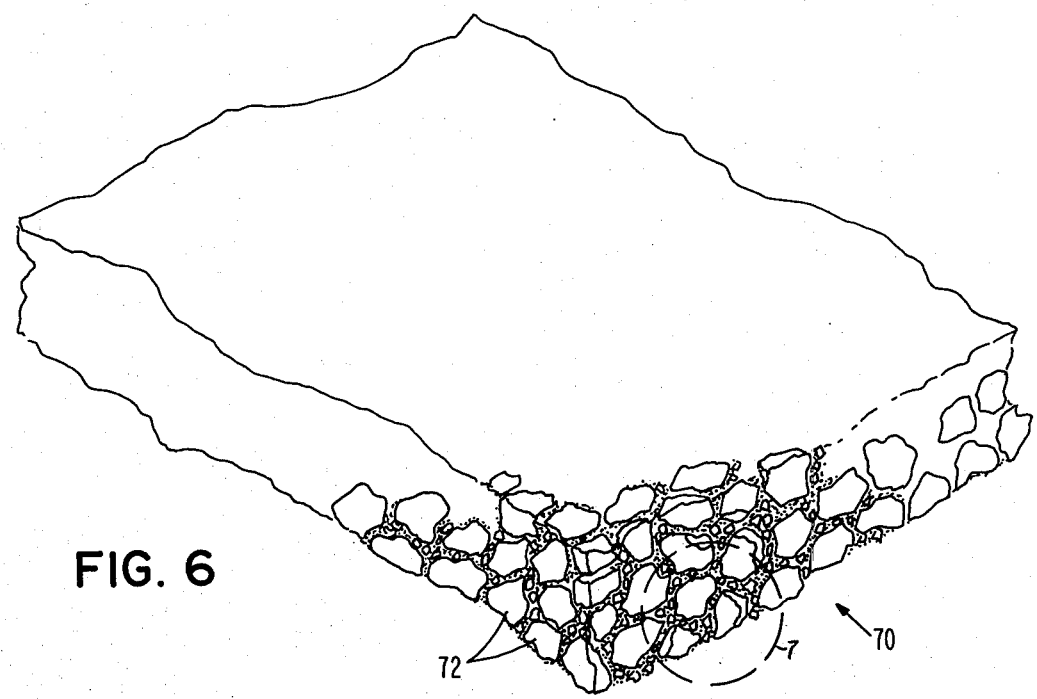
FIG. 6 is a fragmentary isometric view of a body of collection medium employed in the embodiment of FIGS. 1-5.
Figure 7:
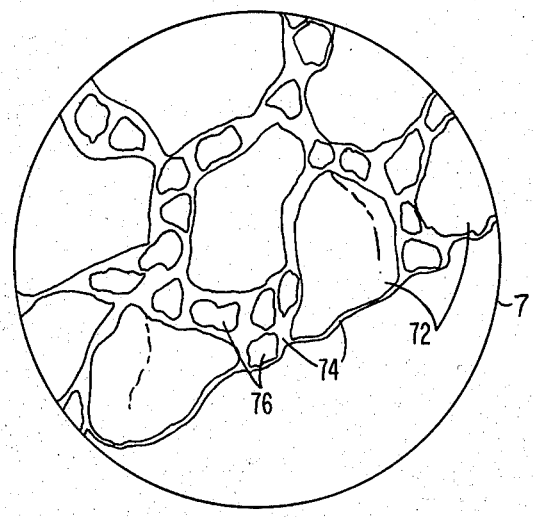
FIG. 7 is a view of a magnified segment of the body shown in FIG. 6.

With reference now to FIGS. 6 and 7, body 70, from which slab 60 is formed, has a given minimum thickness in the direction of a shorter dimension and is composed of a packed plurality of particles 72. Each of particles 72 is selected to have a maximum external dimension of between approximately one-fourth and one-half the thickness of body 70. Permeated throughout particles 72, and forming a continuous coating over the exterior surface of body 70, is an elastomeric binder 74. Binder 74 cohesively rigidifies particles 72 together sufficiently to render body 70, and thus slab 60, at least substantially self-supporting and self-confining. Preferably interspersed throughout the interstices between particles 72 is a further plurality of additional particles 76 that exhibit maximum exterior dimensions less than that of the packed plurality of particles 72. Additional particles 76, however, have a preferred minimum exterior dimension which is not less than the thickness of binder 74 as it exists between the smaller ones of particles 72.

Particles 72 and 76 are formed of a material the primary ingredient of which is carbon. Because of its abundance and comparatively low cost of acquisition, particles 72 and 76 most desirably are produced by crushing natural coal. While many varieties and forms of coal are available, an anthracite coal is preferred in order to assist in achieving maximum effectiveness and uniformity. Being comparatively hard, anthracite coal when crushed produces only a minimum of dust. It also tends to crush to a more uniform particle size. It contains fewer gases or gas-forming impurities and solvents which otherwise might be detrimental in operation at the temperatures involved. As compared with other coals, anthracite exhibits a higher ignition temperature of about three-hundred degrees Centigrade (300° C.) as a result of which any danger of spontaneous combustion is reduced. Contributing to higher effeciencies, anthracite is extremely high in carbon content.

While a choice from among different elastomeric binders 74 is available, silicone rubber is preferred by reason of its totality of various properties. Within the contemplated operating range for slab 60 of between 50° C. and 100° C., and also at higher working temperatures up to at least 150° C., the silicone component exhibits sufficient elasticity to preclude thermal fracturing of the slab at all temperatures within that range and up to at least that higher temperature. It also is non-burnable at temperatures less than 100° C. and higher and is highly conductive of heat energy. At the same time, silicone rubber is substantially inert to the radiant energy from the sun in the sense of not deteriorating as a result of exposure thereto. It also is inert to water, air, salt water and conventional refrigerant fluid such as Freon-12. By reason of the same property, it precludes oxidation of the coal particles.

Besides sealing slab 60 from other substances which may be associated, binder 74 also serves to form a cohesive bond capable of supporting the medium within or as part of a variety of specific structures and especially in an essentially self-supporting manner as illustrated. The preferred elastomer forms an excellent seal with the coal particles and exhibits a strong adhesion thereto, so as to secure the particles into the cohesive form of body 70 when embodied as slab 60. As mentioned, the preferred elastomer also exhibits a high level of elasticity, so that expansion and contraction as between different extremes of the temperature range are accommodated without fracture due to the development of thermal stresses.

As also indicated, the resulting structure of slab 60 exhibits sufficient strength as to be capable of self support. Thus, it may be mounted in any arrangement by abutment against only spaced locations of its surface such as around or near its periphery. At the same time, sufficient strength is exhibited to withstand substantial pressure exerted against its major surface as may occur, for example, in the aforementioned adaptation wherein a liquid is moved over that surface. In translating heat energy received by its collecting surface to an associated element such as tubing 62, body 70 does exhibit a degree of heat loss during that exchange. To minimize the amount of that source of loss in those adaptations wherein efficient heat transfer is more important than any degree of storage, body 70 is so dimensioned that slab 60 has substantially the minimum thickness consistent with the necessary rigidifying together of particles 72.

In forming slab 60, the combination of the particles and the binder preferably is first thoroughly stirred while the binder is in liquid form to insure that all individual particles of any size individually are entirely coated. In one approach, the resulting mixture or slurry is then placed into a suitable mold wherein it is but slightly compressed to achieve continuity throughout its extent while yet leaving a rather rough surface and thereby enhance the efficient capture of the collected solar radiation. The packed mass is then left at rest until binder 74 is cured to a condition of significant hardness. To form slab 60 in a manner in which tubing 62 is embraced therein as specifically shown in the drawings, the tubing, of course, is first suspended centrally within the mold and the mixture thereafter is poured around the tubing.

In one different approach to the forming of body 70, the mixture is placed over other formations of pipes, natural constrictions or various articles in order to form a coating or surrounding envelope which becomes rigid upon curing of binder 74. It is a version of that approach which involves the use of screen 50 included in the embodiment specifically illustrated. Although not needed to support slab 60 after binder 74 has solidified, screen 50 serves in this case to support the wet slurry in place before it cures. That is, the mixture is poured and somewhat smoothed into place on top of screen 50 as well as over and around tubing 62. To this end, the mesh size of screen 50 is chosen to be smaller than primary particles 72. Thus, slab 60 in this approach is molded in situ. In accordance with still one more alternative modification, slab 60 may in itself be molded in a manner to define internal channels the walls of which are coated by binder 74 and which create conduits through which the transporting fluid is to be caused to flow.

In principle, it is not necessary to include additional particles 76. They are decidedly preferred, however, in order to maximize substantially the density of coal within body 70. Considering that coal is a form of rock, it exhibits certain characteristics which remain substantially the same when it is derived from the same vein in the ground. After being crushed into particles, it tends to form individually different particles which are generally of the same overall shape, usually in the form of something that resembles a block or a wedge. Its color, hardness, specific gravity and carbon content are essentially uniform throughout. In a preferred approach, particles shape is used advantageously in the makeup of body 70 and thus of slab 60.

Generally from the standpoint of maximum efficiency during operation as well as cost, it could be desirable to utilize the largest possible size of coal particles. On the other hand, the achievement of maximum strength in slab 60 would suggest the desirability of an opposite approach. It has been found that the achievement of sufficient strength to enable self support of slab 60 is best obtained by selecting particles 72 to have a maximum dimension no greater than one-half the thickness of slab 60. The resulting exterior surfaces of slab 60 then have an appearance similar to that of conventional cement blocks.

Accordingly, the most efficient compromise between maximum efficiency and minimum cost, while yet obtaining minimally sufficient strength, results in the selection of the predominent particle size to be between approximately one-fourth and one-half the thickness of slab 60. Were the foregoing to be the only particle size used, however, small voids filled only with binder 74 would still occupy a substantial portion of the volume within body 70. Greater economy and heat transfer efficiency are obtained by causing those holes to be filled with additional particles 76 of the coal. To that end, a comparatively smaller amount of more finely sized coal particles thus are used and included within the slurry mixture. Consequently, the ultimate density of body 70 is significantly increased.

To determine the quantity of the additional filler particles 76, a volume-ratio method of selection preferably is employed. In carrying out this approach, one unit volume of predominent particles 72 is first measured out. A similar one-unit volume of the smaller added particles 76 is then similarly measured and mixed thoroughly together with the original volume of particles 72. The volume of the resulting additional quantity of combined material is then measured and will be observed to be less than a total of what otherwise would be two units, because a portion of the smaller particles 76 are now filling what were voids between the larger particles 72. Accordingly, the change in resulting volume of the combined mixture represents a ratio that thereafter may be used to establish the amount of a given smaller size of particle 76 necessary for addition to a mixture of larger particles 76 in order to obtain the preferred maximum density.

This procedure may, if desired, be carried further by starting with one unit of the combination of particles 72 and 76 and thereafter adding another unit quantity of yet more-finely divided particles and then making the same measurement, so as to come up with a still different ratio appropriate to the particles sizes that were last added. The same procedure may be continued until still further steps no longer result in any worthwhile continued increase in density, or the point is reached at which any next step would result in a particle size that would end up being of less dimension than the ultimate thickness of binder 74 as finally cured. In any of the steps involved, the measurement of the resultant volume may be accomplished, if desired, by weighing so as to determine mass. It may be necessary to redetermine such ratios whenever a change is made in the ultimate source of coal or the crushing process employed.

Also contributing to a combination of ultimate self-supporting strength and heat transfer efficiency is the comparative amount of binder 74 that is introduced into the slurry. For the purpose of determining a preferred quantity of the binder to be added, a related procedure may be employed. First, a determination is made of the area of coverage by the elastomer that will assure adequate adhesiveness as between the coal particles and adequate coverage thereover to achieve complete sealing thereof. In the case of silicone rubber, it has been found that the manufacturer's specification, for normally obtaining a protective coating over an article, is quite adequate. The overall surface area of an average particle 72 is then measured as is the surface area of an average one of added and smaller particles 76. Adding together all such unit surface areas of the different particles results in a total surface area which needs to be covered by binder 74, and that value represents the largest amount of a given unit of binder 74 necessary to sufficiently mix with and coat the total surface area of the particles. In practice, it has been found that, by reason of the existence of common particles faces, the amount of binder 74 actually required to achieve the desired ends may be reduced by approximately one-third that which would be indicated by the foregoing manner of determination in any given situation. Of course, final testing of the heat collection product preferably is employed to reveal any final adjustments in relative quantities that may be desired.

Experimental results obtained from the aforementioned operated version indicated the attainment of a heat transfer efficiency in an amount that was approximately ninety percent of that obtained when the same area of solar-energy collection is defined entirely by blackened copper. On the other hand, an equivalent amount of copper would weigh considerably more for obtaining that degree of efficiency. In addition, cost analysis indicates that such an alternative approach employing copper would be about eight times as expensive for the cost of the heat collection material.

As will now be apparent, the resulting heat collection element may be molded or otherwise formed into a wide variety of different shapes, so as to accommodate corresponding variation in the overall assembly and its particular mode of operation. The resulting thickness of slab 60 is such as to allow the construction of a transfer system that does not require the use of any kind of secondary collector. Numerous different deficiencies and disadvantages of prior approaches, mentioned in the introduction above, do not exist in the disclosed new and improved approach. Both from the standpoint of cost comparisons and in resulting efficiencies, significant improvement has been found. Also contributing significantly to cost reduction, while yet retaining operational efficiency, is the capability of the collection material to be essentially self-supporting while yet exhibiting excellent transfer efficiencies.

While a particular embodiment of the invention has been shown and described, and a number of other adaptations, variations and modifications also have been fully disclosed, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. A heat energy collector comprising:
   a body having a predetermined minimum thickness and composed of a packed plurality of particles of a material the primary ingredient of which is carbon, each of said particles having a maximum external dimension of between approximately one-fourth and one-half said predetermined thickness;
   and an elastomeric binder, substantially permeated throughout said particles and forming a continuous coating over the exterior surface of said body, cohesively rigidifying said particles together sufficiently to render said body fluid impervious and at least substantially self-supporting.

2. A collector as defined in claim 1 in which said elastomer, in an operating temperature range between 50° C. and 100° C., exhibits sufficient elasticity to preclude fracturing of said body at all temperatures thereof within said range.

3. A collector as defined in claim 1 in which said elastomer is substantially conductive of heat energy.

4. A collector as defined in claim 1 in which said elastomer is non-burnable at temperatures less than at least 100° C.

5. A collector as defined in claim 1 in which said elastomer is composed of silicone rubber as a primary ingredient thereof.

6. A collector as defined in claim 1 in which said collector is receptive of radiant energy and in which said elastomer is substantially inert to said radiant energy.

7. A collector as defined in claim 1 in which said collector is exposed to a fluid and in which said elastomer is inert to said fluid.

8. A collector as defined in claim 7 in which said elastomer precludes oxidation of said particles.

9. A collector as defined in claim 1 in which said collector is subjected to pressure exerted thereagainst and in which the rigidification of said particles is sufficient to withstand said pressure without fracture of said body.

10. A collector as defined in claim 1 in which said predetermined thickness is selected to be of substantially a minimum amount consistent with said rigidifying of said particles.

11. A collector as defined in claim 1 which includes a substrate disposed adjacent to an exterior surface of said body and to which the combination of said body and said binder is molded in situ.

12. A heat energy collector comprising:
    a body having a predetermined minimum thickness and composed of a packed plurality of particles of a material the primary ingredient of which is carbon, each of said particles having a maximum external dimension of between approximately one-fourth and one-half said predetermined thickness;
    an elastomeric binder, substantially permeated throughout said particles and forming a continuous coating over the exterior surface of said body, cohesively rigidifying said particles together sufficiently to render said body fluid impervious and at least substantially self-supporting;
    and said body including a further plurality of additional particles of said material individually having a maximum exterior dimension less than said maximum external dimension and interspersed throughout said packed plurality of particles.

13. A collector as defined in claim 12 in which said maximum exterior dimension is not less than substantially the thickness of said binder between the smaller of said particles.

14. A collector as defined in claim 12 in which the sizes of said additional particles are selected to substantially maximize the density of said material in said body.

15. A heat energy collector comprising:
    a body having a predetermined minimum thickness and composed of a packed plurality of particles of a material the primary ingredient of which is carbon, each of said particles having a maximum external dimension of between approximately one-fourth and one-half said predetermined thickness;
    an elastomeric binder, substantially permeated throughout said particles and forming a continuous coating over the exterior surface of said body, cohesively rigidifying said particles together sufficiently to render said body fluid impervious and at least substantially self-supporting;
    and a hollow tube being at least partially disposed within and carried by said body.

16. A heat energy collector comprising:
    a body having a predetermined minimum thickness and composed of a packed plurality of particles of a material the primary ingredient of which is carbon, each of said particles having a maximum external dimension of between approximately one-fourth and one-half said predetermined thickness;
    an elastomeric binder, substantially permeated throughout said particles and forming a continuous coating over the exterior surface of said body, cohesively rigidifying said particles together sufficiently to render said body fluid impervious and at least substantially self-supporting;
    and including a housing surrounding said collector and means for mounting said collector within said housing.

17. A collector as defined in claim 16 which includes a hollow tube at least partially disposed within said body and means for moving a fluid, transportable of heat energy, through said tube.

18. A collector as defined in claim 16 which includes means for moving a fluid, transportable of heat energy, over a surface of said collector.

19. A collector as defined in claim 18 in which said fluid is a liquid and said collector is immersed in said liquid.

20. A collector as defined in claim 16 in which said housing contains a heat conductive fluid to which said collector is exposed in heat-transfer relationship.

21. A collector as defined in claim 16 in which said housing includes a wall portion substantially transparent to radiant energy, and in which said collector is exposed to said radiant energy conveyed through said wall portion.

* * * * *